United States Patent [19]
Huang et al.

[11] Patent Number: 4,737,760
[45] Date of Patent: Apr. 12, 1988

[54] TIRE PRESSURE WARNING DEVICE

[76] Inventors: Chung-Siung Huang; Hsien-Ching Kuo, both of P.O. Box 87-462, Taipei, Taiwan

[21] Appl. No.: 678,739

[22] Filed: Dec. 6, 1984

[51] Int. Cl.$^4$ .......................... B60C 23/00; F16F 1/36
[52] U.S. Cl. ..................................... 340/58; 73/146.8; 137/227; 267/153; 340/539; 116/34 R
[58] Field of Search .......................... 340/58, 539, 572; 116/34 R; 73/146.8; 267/153; 137/227

[56] References Cited
U.S. PATENT DOCUMENTS

| | | | |
|---|---|---|---|
| 2,910,998 | 11/1959 | Davis | 267/153 X |
| 3,045,704 | 7/1962 | Williams | 267/153 X |
| 3,504,849 | 4/1970 | Quinn | 267/153 X |
| 3,892,398 | 7/1975 | Marsh | 267/153 |
| 4,186,377 | 1/1980 | Barabino | 340/58 |
| 4,208,982 | 6/1980 | Bryam | 116/34 R |
| 4,262,529 | 4/1981 | Rosenblatt et al. | 137/227 X |
| 4,352,097 | 9/1982 | Hamann | 340/572 X |
| 4,450,431 | 5/1984 | Hochstein | 340/58 |
| 4,468,650 | 8/1984 | Barbee | 340/58 |
| 4,591,030 | 5/1986 | Antkowiak | 267/153 X |

FOREIGN PATENT DOCUMENTS 955672 10/1974 Canada .................................. 340/58

Primary Examiner—James L. Rowland
Assistant Examiner—Thomas J. Mullen, Jr.
Attorney, Agent, or Firm—Reising, Ethington, Barnard, Perry & Milton

[57] ABSTRACT

A tire pressure warning device is disclosed which comprises a body adapted to be threaded into the valve stem of the tire, a pressure sensing valve in the body and an elastomeric compression spring acting on the sensing valve to open it when the pressure in the tire is below a predetermined value. In one embodiment an alarm in the body is adapted to produce an audible signal in response to air flow through the sensing valve. In another embodiment the body includes a distendable diaphragm as a pressure sensor and an elastomeric compression spring for closing a switch when the air pressure is below a predetermined value. A radio transmitter in the body transmits a warning signal when the switch is closed. A monitor detects a transmitted audio or radio signal and compares it with a stored reference signal and produces an output signal only when the transmitted signal corresponds to the stored signal.

2 Claims, 8 Drawing Sheets

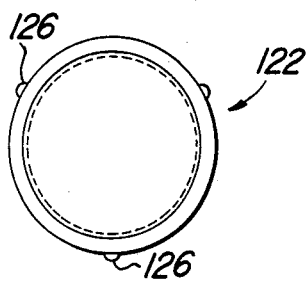
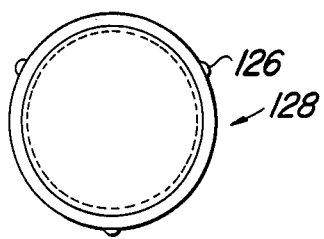
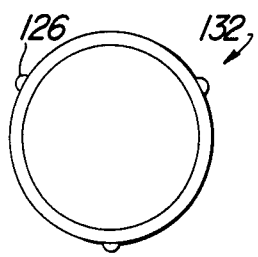
*Fig-2A*  *Fig-3A*  *Fig-4A*
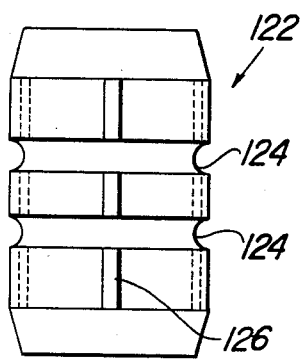
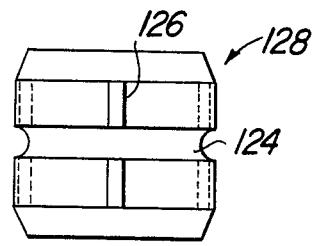
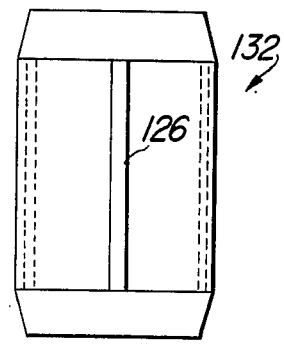
*Fig-2B*  *Fig-3B*  *Fig-4B*
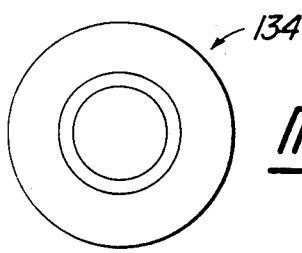
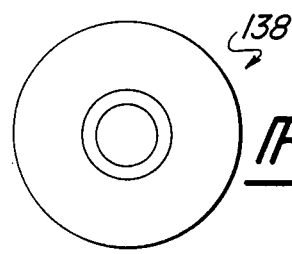
*Fig-5A*  *Fig-6A*
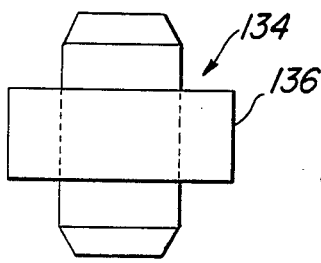
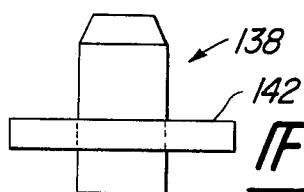
*Fig-5B*  *Fig-6B*
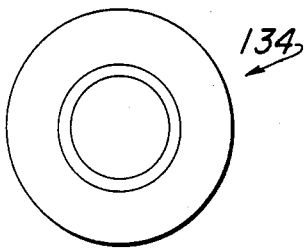
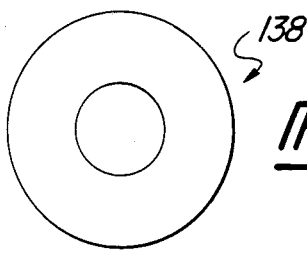
*Fig-5C*  *Fig-6C*

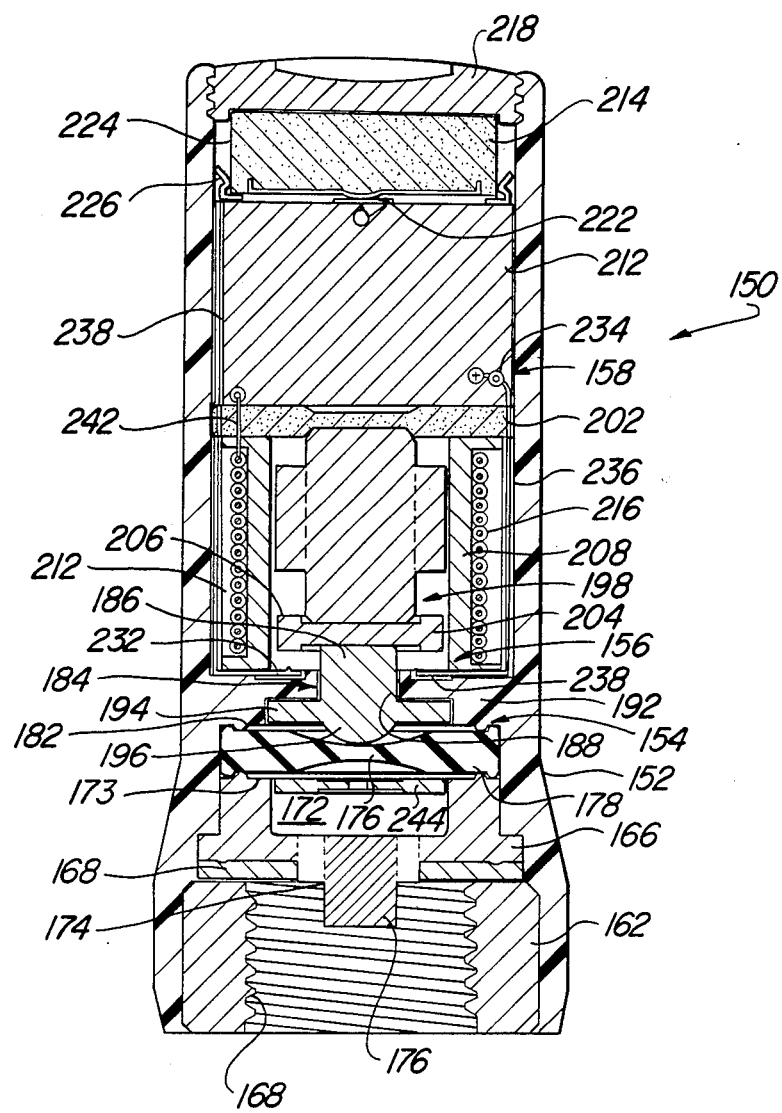
IFig-7

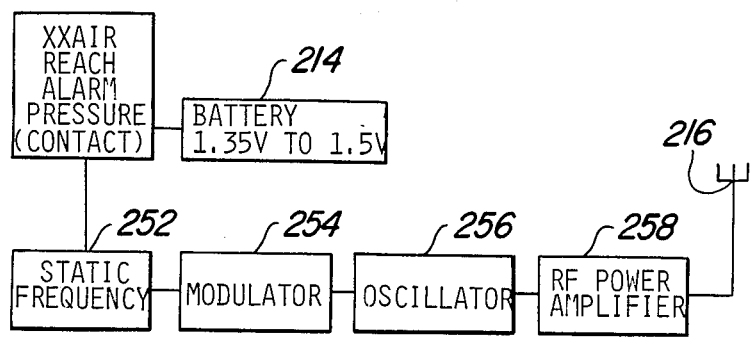
_Fig-9_
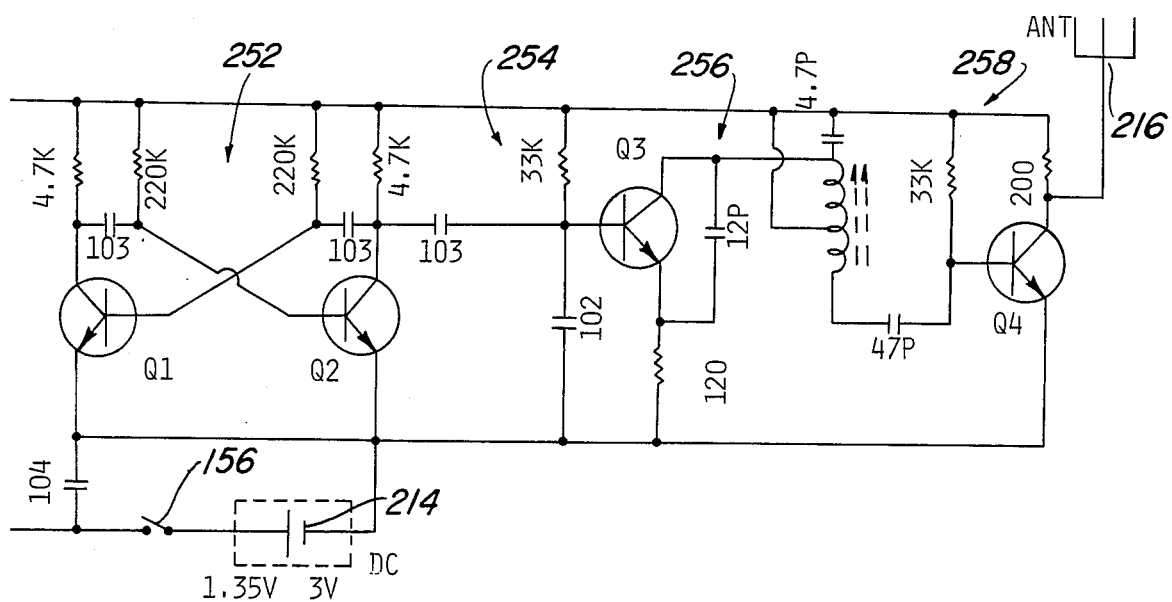
_Fig-10_

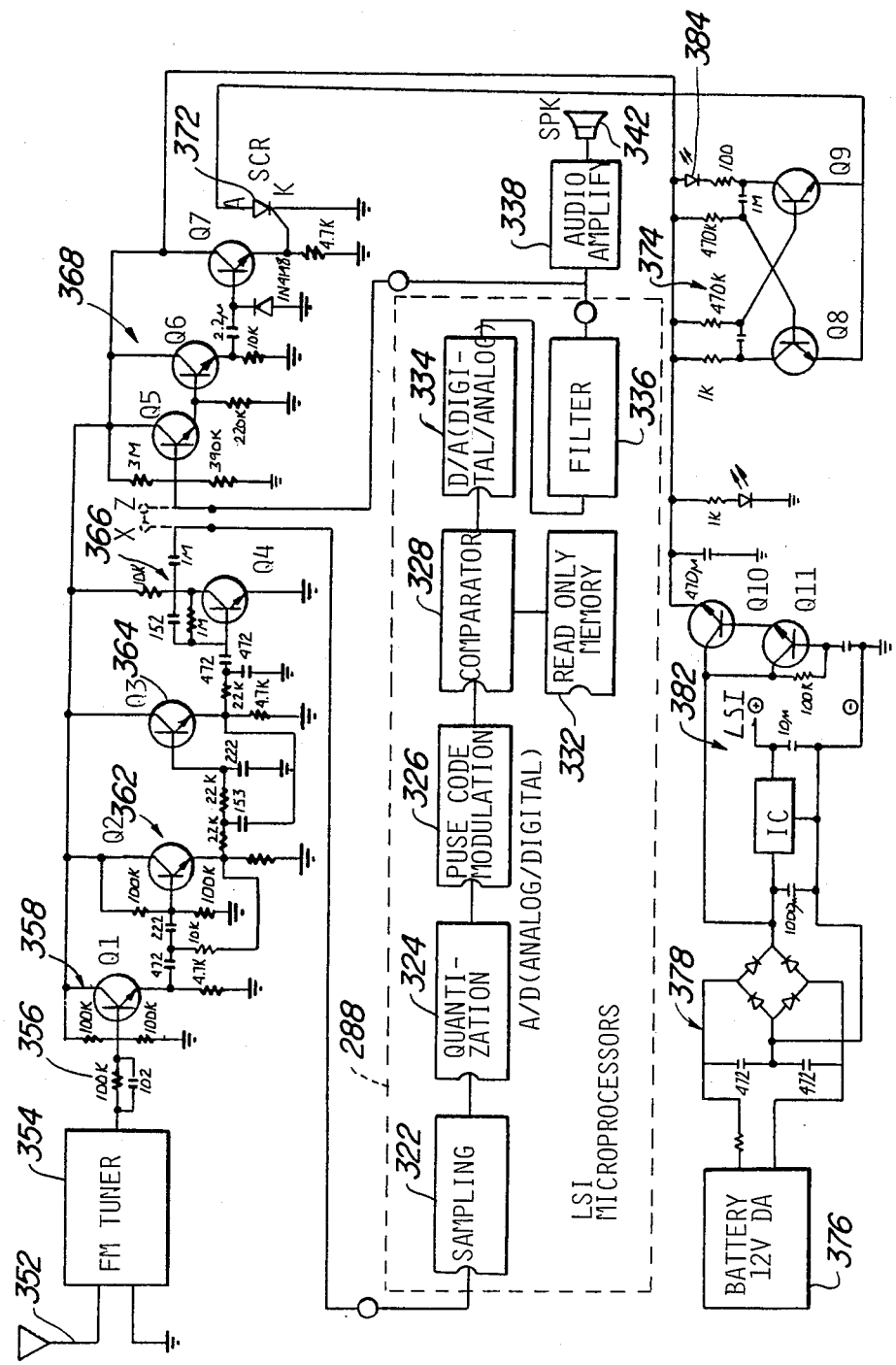

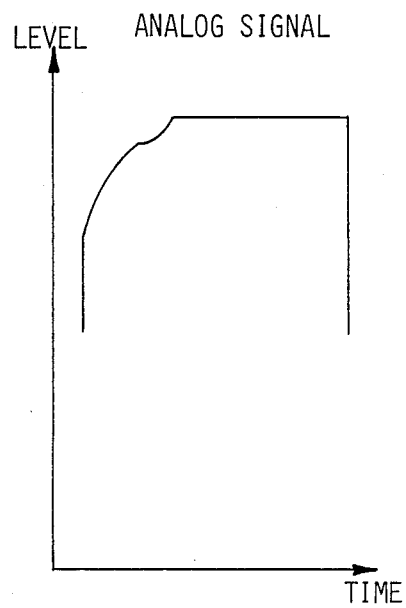
Fig-13A
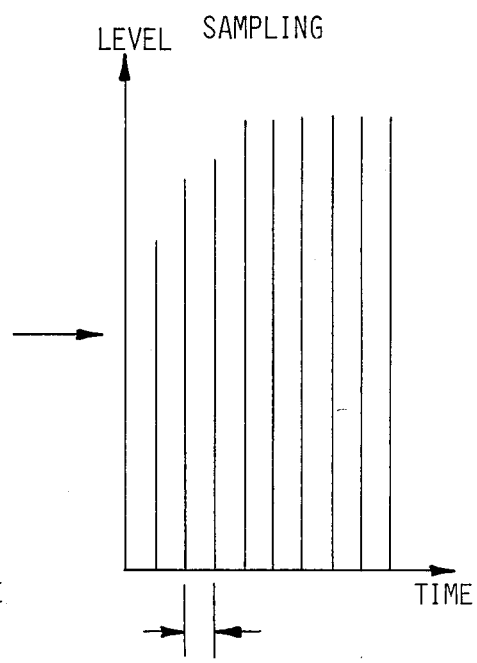
Fig-13B
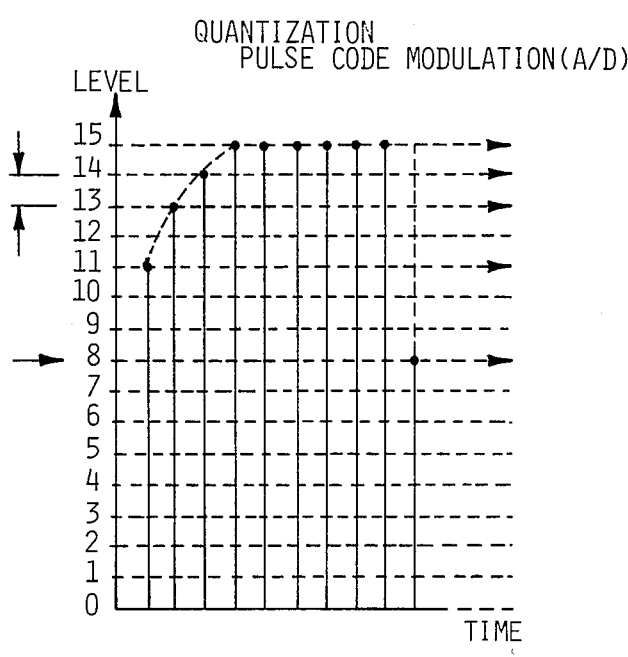
Fig-13C
DIGITAL OUTPUT
1111
1110
1101
1100
1011
1010
1001
1000
0111
0110
0101      1000 1011 1101 1110
0100      1111 1000
0011
0010
0001
0000
Fig-13D

TIRE PRESSURE WARNING DEVICE

FIELD OF THE INVENTION

This invention relates to warning systems especially for vehicle tires; more particularly, it relates to systems in which a device is mounted on the valve stem of the vehicle tire to produce a warning signal upon occurrence of low tire pressure.

BACKGROUND OF THE INVENTION

A need exists for a reliable low cost device for warning a vehicle driver of loss of air pressure in any of the vehicle tires. Such a warning system serves not only the purpose of safe vehicle operation but also it reduces damage to vehicle tires which results from running at low pressure. Many devices have been proposed but they have the disadvantage of being unreliable, too costly or too complicated.

In the prior art, it is known to provide a device on the valve stem of a tire for the purpose of warning the driver by an explosive report that the tire pressure is below a predetermined value. In general, such devices comprise a housing which is adapted to be screwed onto the filler valve stem of a tire and which contains a pressure sensing valve. A discharge passage in the housing is closed by an inflatable balloon and a closure valve is disposed in the discharge passage. So long as the tire pressure is above a predetermined value, the sensing valve remains closed. When the tire pressure drops below a predetermined value, the sensing valve is opened and the pressurized air from the tire is admitted to the balloon and it is inflated until it explodes. Upon explosion of the balloon a rush of air through the discharge passage causes the closure valve to be closed to prevent further loss of tire pressure. Devices of this type are described in the Su U.S. Pat. No. 4,024,829 granted May 24, 1977 and the Yu U.S. Pat. No. 4,155,325 granted May 22, 1979.

An improved warning device of the type described above is set forth in our copending patent application Ser. No. 478,321 filed Mar. 24, 1983 now U.S. Pat. No. 4,601,254 and entitled "TIRE PRESSURE WARNING DEVICE". The disclosure of that patent application is hereby incorporated herein by reference.

In the prior art, it is also known to utilize a device on the tire for transmitting the signal wave to a monitor on the vehicle when the tire pressure falls below a predetermined value.

A general objective of this invention is to provide an improved tire pressure warning system which overcomes certain disadvantages of the prior art.

SUMMARY OF THE INVENTION

This invention provides a tire pressure warning system which operates with a high degree of reliability and accuracy under all operating conditions. Moreover, it is of low cost construction and of a design which facilitates ecomonical manufacture.

In accordance with this invention, there is set forth herein:

(1) An improved acoustical type of tire pressure warning system.

(2) A new type of spring for use with tire pressure warning systems and other devices and which is of high accuracy over a very wide temperature range.

(3) An electronic tire pressure warning system including a radio signal transmitter on the valve stem and a signal monitor in the vehicle.

(4) A signal monitor for use with the acoustic or the electronic signal transmitting device.

A more complete understanding of this invention may be obtained from the detailed description that follows taken with the accompanying drawings.

DESCRIPTION OF THE DRAWINGS

FIGS. 2 through 6 show a new spring of this invention;

FIGS. 7 through 10 show an electronic tire pressure warning device of this invention;

FIG. 12 shows an electromagnetic signal monitor of this invention; and

FIGS. 13A, 13B, 13C and 13D are used to aid explanation of the detector in the monitor.

BEST MODE FOR CARRYING OUT THE INVENTION

Figure 1:
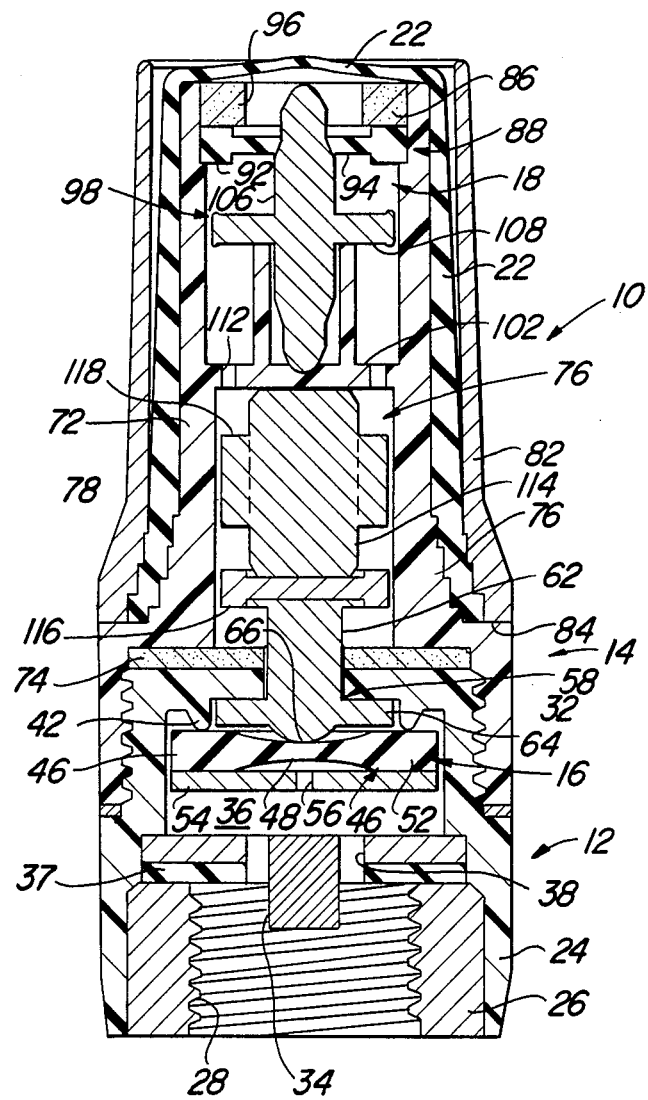
FIG. 1 shows an acoustic tire pressure warning device of this invention.
Figure 8:
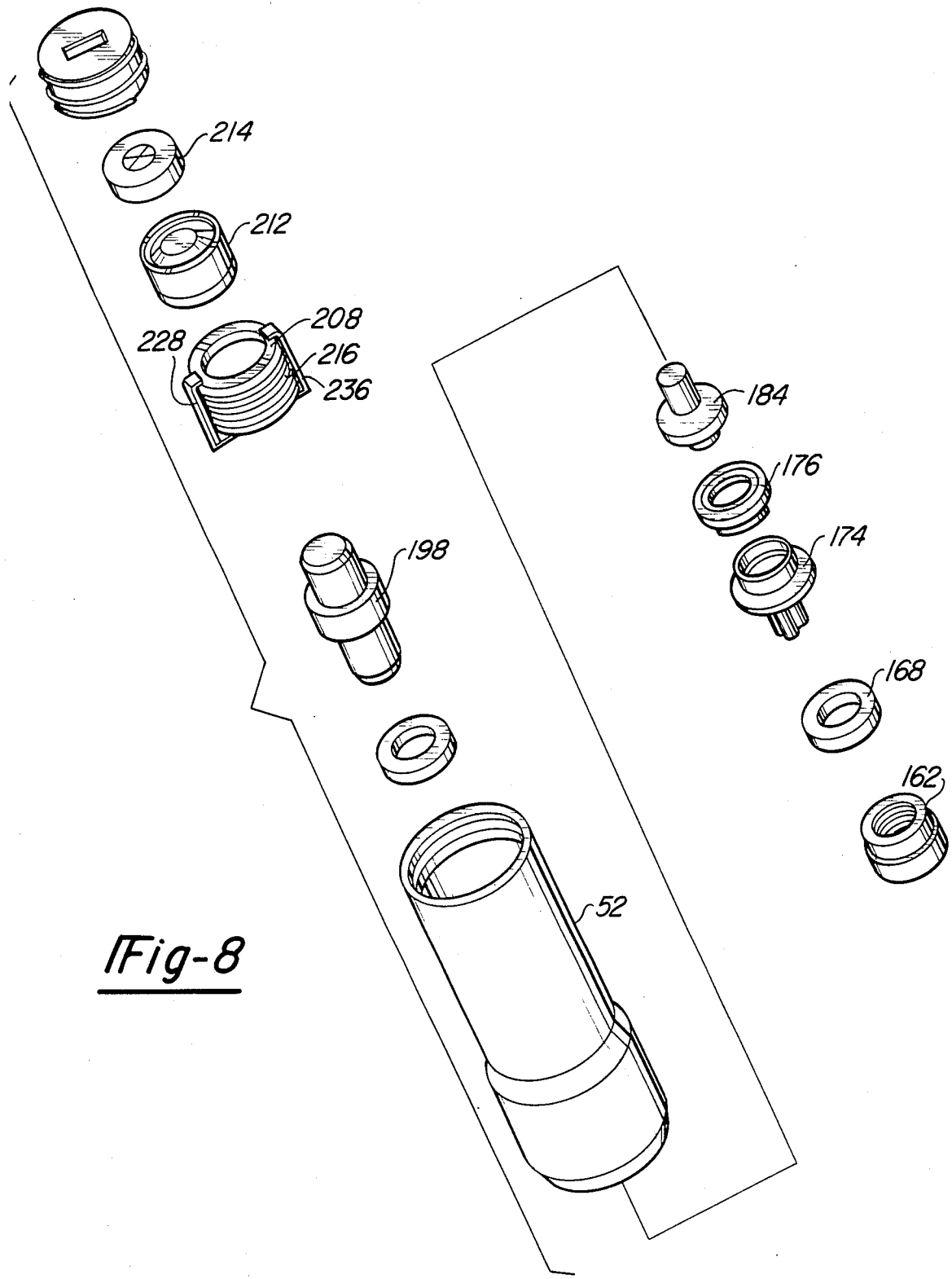

Referring now to the drawings, there is shown an illustrative embodiment of the invention in a tire pressure warning system for vehicle tires. The system is adapted for use on either passenger car tires or on truck tires. It will be appreciated, as the description proceeds, that the invention may be embodied in different forms and may be useful in other applications.

A pressure warning device 10 as shown in FIG. 1, is adapted to be installed on the valve stem of a vehicle tire. It will be understood that a separate warning device 10 is installed on each of the vehicle wheels and remains in place during vehicle operation. The pressure warning device 10 comprises, in general, a connector member 12 which is adapted to be screwed on the valve stem of the tire and a cap member 14 which is adapted to be screwed onto the connector member 12. The connector member 12 contains a pressure warning sensing valve 16. The cap member 14 contains a closure valve 18 and it supports a warning signal element or acoustic alarm in the form of an elastomeric balloon 22.

The connector member 12 comprises a plastic body 24, generally of circular cross section. A sleeve 26 with a threaded bore 28 is inserted within the lower end of the plastic body 24 and is ultrasonically welded thereto. The threaded bore 28 is adapted to be screwed onto the stem of the tire valve. The body 24 has an external thread 32 at its upper end. The connector member 12 includes a valve opener 34 which is adapted to depress the tire valve and open it when the connector member is screwed onto the valve stem. An elastomeric gasket 37 is disposed between the annular flange of the valve opener 34 and the upper end of the sleeve 26 to provide an air tight seal therebetween. The pressure sensing valve 16 is disposed within a valve chamber 36 which communicates through an inlet passage including a set of ports 38 with the internally threaded bore 28. Thus, when the connector member 12 is screwed onto the valve stem, the tire valve is opened and pressurized air from the tire is admitted through the inlet passage to the valve chamber 36. The pressure sensing valve 16, as will become apparent, is operative to block the escape of pressurized air from the tire when the connector member is screwed onto the stem.

The pressure sensing valve 16 comprises a valve seat 42 of annular configuration formed on the inside of the top of the plastic body 24. The valve body 24 defines a central outlet port 44 in the top thereof within the annular valve seat 42. The outlet port 44 communicates with the valve chamber 36. A movable valve element 46 comprises a diaphragm 48 surrounded by an annular rim 52. The rim 52 is adapted to engage the valve seat 42. A piston 54 is adapted to engage the rim 46 of the valve element. An opening 56 extends through the center of the piston 54. A valve actuator 58 comprises a stem 62 extending through the port 44 and an annular flange 64 for retaining the actuator in the valve body. An arcuate dome 66 is provided on the lower end of the actuator 62 for engaging the diaphragm 48.

It will be understood that the connector member 12 constitutes a subassembly and it may be separately installed on the valve stem of the vehicle tire or it may be integrally joined with the cap member 14 prior to installation on the valve stem. In either case, when the connector body 12 is screwed onto the valve stem, the end of the valve stem seats on the gasket 36 and forms an air tight seal therewith. The valve opener 34 opens the tire valve and pressurized air is admitted through the ports 38 to the valve chamber 36. The pressurized air causes the valve element 46 to be seated with the annular rim 46 thereof in air tight engagement with the annular valve seat 42. Thus the pressure sensing valve 16 is closed and prevents the escape of pressurized air from the tire.

The cap member 4 comprises a sleeve 72 with an internally threaded end adapted to engage the threaded sleeve 32 on the connector member 12. The gasket 74 provides an air tight seal with the valve body 12. The cap member contains the closure valve 18 and it also contains a valve actuating means 76 in a cavity 78. The outer end of the sleeve 72 is enclosed by the balloon 22.

The balloon 22 is secured at its open end to the sleeve 72 by a coupling sleeve 82. The sleeve 72 of the cap member is provided with a set of annular bands located adjacent a seating shoulder 84 against which the lower open end of the balloon is seated. The coupling sleeve 82 is provided with a complementary set of annular bands opposite those on the sleeve 72. The wall of the balloon 22 is squeezed between the opposed annular bands to retain the balloon and provide an air seal. Further, the coupling sleeve 82 at its lower end is bonded by ultrasonic welding to the seating shoulder 84 on the sleeve 72.

The closure valve 18 comprises a valve body in the form of an annular ring 86 which is secured to the open end of the sleeve 72 by ultra sonic welding. The closure valve 18 comprises a valve seat 88 which engages the annular ring 86 and is seated against an internal annular shoulder on the sleeve 72. The valve seat 88 comprises an annular rim 92 and a set of radial spokes 94 which terminate at a central opening. The valve seat 88 is preferably constructed of soft pliable rubber or similar plastic material. The annular ring 86 defines an outlet port 96 which is surrounded by the valve seat 88. The closure valve 18 also comprises a movable valve element 98 which is normally held in a guide cup 102 between a wall 104 and the valve seat 88 with the closure valve open. The movable valve element 98 comprises a piston 106 with a tapered nose engaging the free ends of the spokes 94. It also comprises an annular flange 108 which is adapted to engage the annular rim 92 of the valve seat 88 when the valve element 98 is forced outwardly causing the piston 106 to extend through the spokes 94. The wall 104 is provided with a set of passages 112 which provide communication between the cavity 78 and the valve seat 88.

The cap member 14 also contains the valve actuating means 76 which includes a spring 114 and a spring holder 116. The spring 114 is of special form comprising a unitary body of elastomeric material which will be described in detail subsequently. The spring 114 has its upper end seated against the wall 102 and its lower end seated on the spring holder 116. The spring 114 also includes a stabilizer flange 118.

When the sleeve 72 of the cap member 14 is screwed onto the connector member 12, the gasket 74 forms an air tight seal between the sleeve 72 and the threaded sleeve 32. At the same time, the stem 62 of the valve actuator 58 engages the spring holder 116. This causes the spring 76 to be compressed so that the parts are in the relative positions shown.

In use, the tire pressure warning device is installed on the tire valve stem after making sure that the tire is properly inflated. The device may be installed, as previously noted, by first screwing the connector member 12 onto the valve stem and then screwing the cap member 14 onto the connector member or the two members may be screwed together first and then the connector member 12 screwed onto the valve stem. In either case, after installation, the parts are in the relative position shown. The spring 114 exerts a bias force through the valve actuator 58 tending to open the movable valve element 46 of the sensing valve 16. This bias force is overbalanced by the force exerted on the movable valve element 46 by the pressurized air of the tire. Thus, the pressure sensing valve 16 is in a stable operating condition with the valve closed so long as the air pressure in the tire remains above a predetermined value.

In the event that the tire loses air pressure by reason of leakage, the force exerted on the movable valve element 46 will diminish. As the tire pressure progressively decreases, the force exerted on the valve actuator 58 by the movable valve element 46 progressively decreases. At a threshold value of pressure, the force exerted by the valve actuator 58 will be equal and opposite to the bias force exerted by the spring 114 through the spring holder 116. Any further decrease in the air pressure of the tire will result in a lesser force exerted on the valve actuator by the movable valve element 46 and that bias force exerted by the spring. Consequently, the valve actuator will be pushed against the diaphragm 48. This allows the spring to elongate and thus the bias force exerted thereby is decreased until it becomes equal to the force exerted with the valve actuator 58 by the diaphragm 48. The predetermined increment of decrease in the tire pressure from the threshold value to a predetermined value will occur without opening the pressure sensing valve 16 because of the action of the diaphragm 48. During this increment of pressure change, the actuator 58 is moved by the bias force of the spring 76 and it pushes the actuator against the diaphragm 48. However, the annular rim 52 of the movable valve element remains seated against the valve seat 42 so that the pressure sensing valve 16 remains closed. This obtains because the diaphragm 48 is distended by the actuator 58 and, throughout the increment of pressure decrease, the force on the diaphragm is less than that required to lift the annular rim 52 from the valve seat 42. However, at the predetermined pressure value, the diaphragm 48 is sufficiently distended that the force exerted thereon by the valve actuator 58 overcomes the seating force on the valve element 46 exerted by the air pressure by the tire. Consequently, the annular rim 52 of the valve element is unseated from the valve seat 54 and the sensing valve 16 is opened. It will be appreciated that the operation of the pressure sensing valve 16, as just described, will be the same for a slow leaking tire as for a fast leak or blow-out.

When there is a loss of tire pressure and the pressure diminishes to the predetermined value, the pressure sensing valve 16 is opened, as described above. As a result, the pressurized air from the tire flows through the outlet port 44 into the cavity 78 and thence through the passages 112 past the closure valve element 98 and through the outlet port 96 of the interior of the balloon 22. Consequently, the balloon 22 is inflated by the pressurized air from the tire until it ruptures, i.e. it explodes with a loud audible report. When the balloon explodes, there is an outrush of air through the outlet port 96 and this air flow exerts a force on the closure valve element 98 causing it to overcome the resistance of the spokes 94 and to be seated with its annular flange 108 against the annular rim 92 of the valve seat 88. Thus, the closure valve is closed and prevents further escape of air from the tire through the port 96. When the balloon explodes, the driver is warned that the tire pressure has decreased to an unsafe value. No further tire air is lost after the balloon explodes and the driver may take measures to attend to the tire.

ELASTOMERIC SPRING

A compression spring, constructed as a unitary body of elastomeric material as shown in FIGS. 2 through 6, is especially adapted for use in the pressure warning device of this invention. For the sake of accuracy, it is required that the spring in a pressure warning device exhibit a spring force which is substantially independent of temperature. For tire pressure warning devices, extreme temperature range must be covered. Silicone rubber is a preferred material and exhibits temperature stability over a range from about −70 degrees C. to +370 degrees C. Other elastomeric materials which exhibit the desired temperature stability may also be used. The spring is suitably produced by injection molding and, in order to obtain uniformity, precise control of the mix, timing of injection, temperature pressure and curing time is required. The hardness of the material must be controlled to obtain the desired spring force.

FIGS. 2A and 2B show one embodiment of the elastomeric spring. In this embodiment, the spring 122 comprises a generally cylindrical body that is adapted to function as a compression spring. The ends of the body are of reduced diameter in order to provide a concentration of the applied compressive forces nearer the center line of the body. The body is provided with a pair of circumferential grooves 124 which are adapted to absorb the compression of the spring and to avoid expansion of the girth of the spring body. Additionally, the body is provided with three equally spaced axially extending ribs 126 which are adapted to hold the spring body straight within a container. The spring 128 of FIGS. 3A and 3B is similar but is provided with only one circumferential or annular groove 124. The spring 132 of FIGS. 4A and 4B is also similar to that of FIGS. 2A and 2B except that no annular grooves are provided in the body. The axially extending ribs 126 serve as a stabilizer when the spring is inside a container to avoid expanding the girth of the spring body.

The spring 134 of FIGS. 5A, 5B and 5C comprises a generally cylindrical body with end sections of reduced diameter and an annular flange 136 at the mid-section of the body. The flange 136 serves as a stabilizer to hold the spring straight inside a container. Also, the flange will keep the spring from changing shape and hold it straight. This spring is adapted for use with a spring holder having an annular shoulder in alignment with the annular flange so that the flange rests on the shoulder when the spring is compressed. This arrangement enhances the consistency of spring force. The spring 138 of FIGS. 6A, 6B and 6C is similar to spring 134. Spring 138 is adapted to be retained in the spring holder and the bottom end is not of reduced diameter. An annular flange 142 is provided for the same purpose as in spring 134.

ELECTRONIC WARNING DEVICE

An electronic pressure washing device for transmitting an electromagnetic signal is depicted in FIGS. 7, 8, 9 and 10. A pressure warning device 150 as shown in FIG. 7 is adapted to be installed on a valve stem of the vehicle tire. A separate warning device 150 is installed on each of the vehicle wheels and remains in place during vehicle operation. The device comprises a one piece body 152 which is adapted to be screwed on the valve stem of the tire. The body 152 contains a pressure sensor 154, an electric switch 156 actuated by the sensor and a radio signal transmitter 158.

The body 152 contains a sleeve 162 with a threaded bore 164 which is adapted to be screwed onto the stem of the tire valve. A valve opener 166 is adapted to depress a tire valve and open it when the body 152 is screwed onto the valve stem. An elastomeric gasket 168 is disposed between the valve opener 166 the uppe end of the sleeve 162. The pressure sensor 154 is disposed within a chamber 172 which communicates through an inlet passage including a set of ports with the threaded bore 164. When the body 152 is screwed onto the valve stem, the tire valve is opened and the pressurized air from the tire is admitted to the chamber 172.

The pressure sensor 154 comprises a diaphragm 176 with a unitary rim 178 which is held between an annular shoulder 177 on the valve opener 166 and an annular shoulder 182 on the body 152. The periphery of the rim 178 is provided with a sealing bead on both sides and each of the shoulders 177 and 182 are provided with annular sealing beads for engaging the rim 178. The diaphragm 176 and the rim 178 are constructed of elastomeric material such as rubber. The beads on the rim 178 and the beads on the shoulders 177 and 182 provide a double air seal to prevent escape of air from the chamber 172. A pressure sensor also includes an actuator 184 comprising a stem 186 extending through an opening 188 in an interior wall 192. An annular flange 194 is provided on the actuator 184 inside the wall 192 and an arcuate dome 196 is provided on the lower end of the actuator for engaging the diaphragm 176. The pressure sensor 154 also comprises an elastomeric spring 198 which is of the type previously described with reference to FIG. 5. The elastomeric spring has its upper end seated in a spring holder 202 and its lower end is seated against a contact ring 204 which, in turn, is seated against the upper end of the actuator 184. The contact ring 204 is constructed of metallic material and has an annular rim 206 which serves as an electrical contact as will be described subsequently. The spring 198 is contained within a sleeve 208 which extends between the spring holder 202 and the wall 192. The pressure sensor also includes the switch 156 which will be described in conjunction with the electronic signal transmitter.

The signal transmitter 158 comprises an electronic circuit board or chip 212, a battery 214 and an antenna 216. The battery 214 is preferably a lithium battery of cylindrical shape and it is held in place by a cover plate 218 which is screwed into the body 152. The battery 214 has its negative terminal 222 connected directly with a contact on the chip 212. A positive terminal of the battery comprises the casing 224 which is engaged by a battery contact 206. The battery contact 226 is connected by a conductor 228 (see FIG. 8) to a fixed contact 232 which is disposed opposite the contact ring 204. The chip 212 has a positive terminal 234 which is connected through a conductor 236 to a fixed contact 238 disposed opposite the ring contact 204. The ring contact 204 is adapted to move into engagement with the fixed contacts 232 and 238 as a bridging contact and thus close the switch 156. The condition of the switch 156, closed or open, is dependent upon the pressure sensor 154. The sleeve 208 is of insulating material and serves as a holder for the antenna 216 which takes the form of a conductive coil wrapped around the sleeve 208. The antenna 216 is connected by a conductor 242 to the chip 212.

When the pressure warning device 150 is installed onto the valve stem of a tire, the pressurized air from the tire is admitted to the chamber 172. A disk or piston 244 is disposed within the air chamber and is provided with a central aperture. The piston 244 pushes against the diaphragm 196 and protects the diaphragm from abrasion or dirt particles. The air pressure in the chamber 172 causes the diaphragm 176 to displace the actuator 184 and compress the spring 198. With the tire air pressure at a predetermined value, the spring 198 is compressed sufficiently to maintain the contact ring 206 spaced from the fixed contacts 232 and 238, i.e. with the switch 156 in the open condition. When the tire pressure falls below a predetermined value, the force exerted by the spring 198 overcomes the force exerted by the diaphragm 176 and the contact ring 204 closes against the fixed contacts and the switch 156 is closed. Thus, the battery power is supplied to the chip 212 and the electronic circuit of the chip is operative to transmit the warning signal through the antenna 216.

The electronic circuit of the chip 212 is shown in FIGS. 9 and 10. The electronic circuit is preferably a single integrated circuit chip with all of the components integrated into the chip. It comprises a fixed frequency oscillator 252 which is coupled by a modulator circuit 254 with an RF carrier wave oscillator 256. The output of the carrier oscillator 256 is supplied through an RF power amplifier 258 to the antenna 216. The carrier wave is within the FM band preferably in the 76 MHZ to 108 MHZ range. The fixed frequency oscillator may suitably operate in the audio range, say about 3,000 hertz. As shown in FIG. 10, the switch 156 connects the battery 214 to the oscillator circuits. When the switch is closed the warning signal is transmitted.

MONITOR FOR ACOUSTIC WARNING DEVICE

Figure 11:
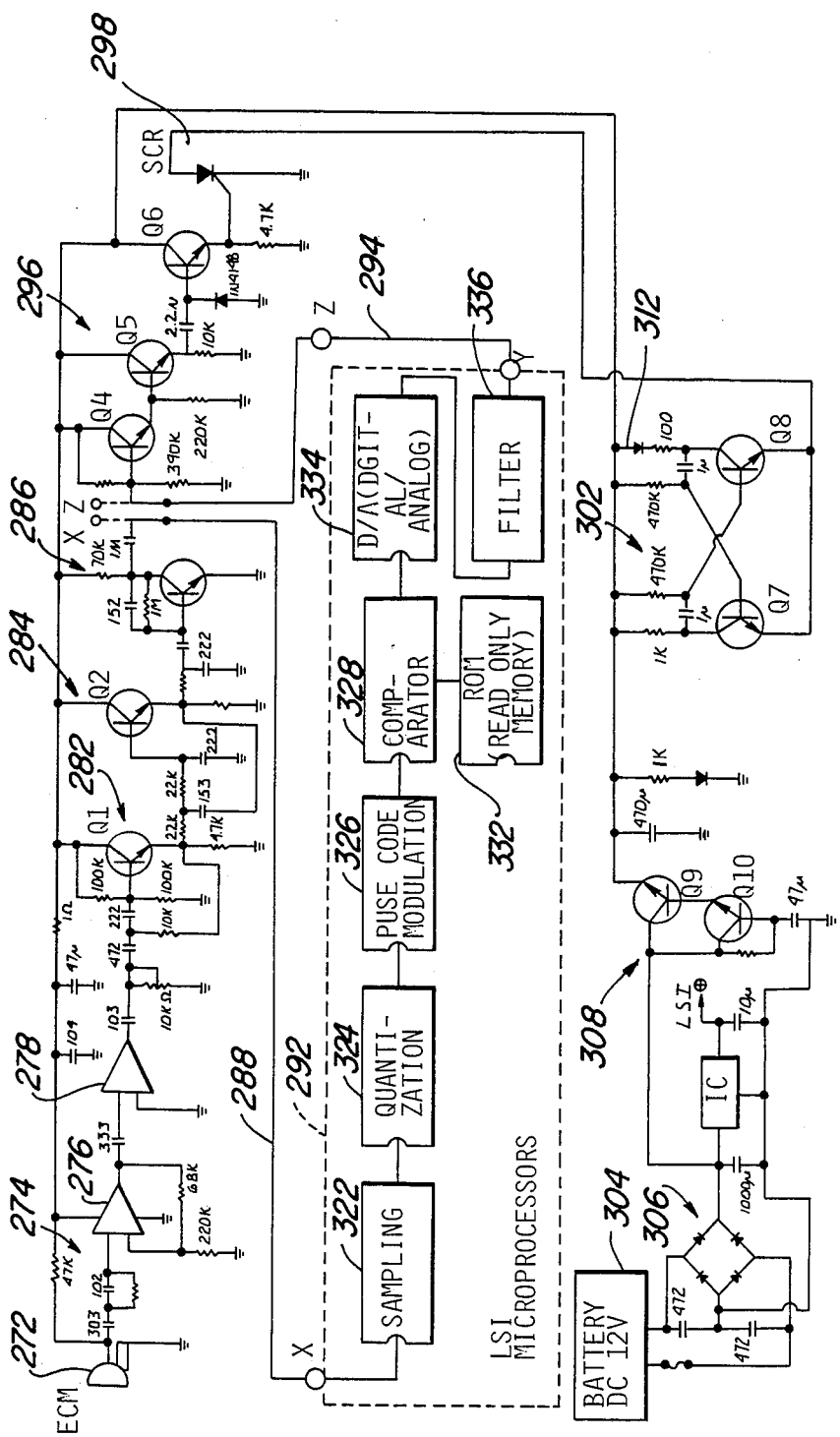
FIG. 11 shows an acoustic signal monitor of this invention.

The acoustic warning device, as previously described, makes a sufficiently loud noise that the warning signal can be readily heard by the driver of a passenger car. However, for use with trucks it may be desirable to provide an electronic monitor to ensure that the warning signal is heard by the driver. A monitor for the acoustic warning device is shown in FIG. 11. It comprises a condenser microphone 272 which is connected through a filter circuit 274 to a preamplifier 276. The output of the preamplifier 276 is applied to a preamplifier 278 the output of which is applied through a low pass filter 282 and a high pass filter 284 to an amplifier 286. The output of the amplifier 286 is applied through a conductor 288 to the input of a special detector circuit 292 which will be described subsequently. The output of the detector circuit 292 is applied through a conductor 294 to a trigger circuit 296 which is adapted to turn on an SCR 298 when a warning signal is received. The SCR is adapted to complete the energizing circuit for a multivibrator 302 by completing the ground circuit. The multivibrator 302 is energized from the vehicle battery 304 through a power supply circuit 306 and a power relay circuit 308. When an acoustic warning signal is received by the condenser microphone 272, the SCR 298 is turned on and the multivibrator 302 is energized. This causes the LED 312 to flash when the multivibrator circuit to be flashed as a warning to the driver of a low tire pressure.

SPECIAL DETECTOR

The special detector 292 shown in FIG. 11 is adapted to prevent a false warning signal by response of the monitor to spurious signals, i.e. to ensure that it responds only to a warning signal from the pressure warning device. The special warning detector 292 will be described with reference to FIGS. 11 and 13A, 13B, 13C and 13D. The analog signal which is applied at the input of the detector is of the character as shown in FIG. 13A. This analog signal is applied to a sampling circuit 322 in which the analog signal is sampled on a time basis to determine the magnitude thereof at discrete time intervals, as shown in FIG. 13B. There is a time bar at each of the discrete sampling times, the bar having a magnitude corresponding to the magnitude of the analog signal at that time. The output of the sampling circuit 322 is applied to the input of a quantization circuit 324 which operates as an analog-to-digital converter. The output of the quantization circuit 324 is applied to the input of a pulse code modulation circuit 326. As shown in FIGS. 13C and 13D, the signal is converted to digital form in this process. As shown in FIGS. 13C and 13D, the signal rises from a level eight to a level eleven at the first time bar and then rises to level thirteen at the second bar, to level fourteen at the third bar, to level fifteen at bars four through nine. At the tenth bar, the level drops from level fifteen to level eight. These quantified signals are then converted into ones and zeros. As noted, for example, the first bar is converted to 1011, the second bar is 1101, the third bar is 110, etc. The digital code from the circuit 326 is applied to one input of a comparator 328. The other input of the comparator 328 receives an input from a read-only memory 332 which stores digital form signal corresponding to that produced by the pressure warning device. If the received signal corresponds with the stored signal, the comparator 328 produces an output which is applied to the digital-to-analog converter 334. This converter produces an analog audio signal which is applied through a filter 336 to the input of the trigger circuit 296. Alternatively, the output of the filter could be applied to an audio amplifier is connected with a speaker to produce an audible, low pressure warning signal.

MONITOR FOR ELECTRONIC WARNING DEVICE

A monitor for the electronic warning device is shown in FIG. 12. It comprises a receiving antenna 352 and an FM tuner 354 which receives and demodulates the FM transmission from the electronic warning device. The demodulated signal, an audio signal from the FM tuner is applied through a filter 356 and a preamplifier 358 to a low pass filter 362 and a high pass filter 364 and thence to an amplifier 366.

The monitor of FIG. 12 for the electronic warning device may be provided with the special detector 288 in some special applications. FIG. 12 shows it with the detector 288. However, since the FM transmission frequencies are very high in the ultra high frequency range, there is little chance of false signals and in most applications the special detector 288 may be dispensed with.

When the special detector 288 is not used, the output of the amplifier 366 is connected to the x and z connection points directly to a trigger circuit 368, thus bypassing the detector 288. The output of the trigger circuit 368 is connected to an SCR 372. The SCR 372 is turned on in response to the receipt of a warning signal by the monitor. The output of this SCR is adapted to provide a ground connection for a multivibrator 374. The multivibrator is supplied with power from the vehicle battery 376 through a power supply circuit 378 and a power delay circuit 382. When the SCR 372 is turned on by receipt of a warning signal, the multivibrator energizing circuit is completed. An LED 384 is connected in the circuit of the multivibrator 374 is flashed on as a low pressure warning signal.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a tire pressure warning device of the type comprising:
   a body adapted to be threaded onto the filler valve stem of a tire and to open the tire valve therein and admit pressurized air from the tire to an inlet passage in said body,
   a pressure sensing valve in fluid communication with said inlet passage, the pressurized air therein tending to close said sensing valve,
   actuating means acting on the sensing valve to open it when the pressure of the pressurized air is below a predetermined value whereby air from the tire is allowed to flow through the sensing valve to an outlet passage in said body,
   and alarm means in fluid communication with the outlet passage and adapted to produce an alarm signal in response to flow of air through the sensing valve,
   the improvement wherein,
   said actuating means comprises a silicone rubber compression spring.

2. A tire pressure warning device comprising:
   a body adapted to be threaded onto the filler valve stem of a tire and to open the tire valve therein and admit pressurized air from the tire to an inlet passage in said body,
   a pressure sensor including a distendable diaphragm in fluid communication with said inlet passage,
   switching means and a switch actuator,
   said switch actuator comprising a silicone rubber compression spring for closing the switching means when the pressure of the pressurized air is below a predetermined value,
   a radio transmitter and a battery in said body,
   said switching means being adapted to connect the battery to the transmitter for transmitting a warning signal.

* * * * *